United States Patent [19]

van Mil

[11] 4,292,709
[45] Oct. 6, 1981

[54] PICKING ELEMENT FOR A POULTRY PICKING APPARATUS

[75] Inventor: Martinus P. G. van Mil, Boxmeer, Netherlands

[73] Assignee: Stork PMT B.V., Netherlands

[21] Appl. No.: 145,017

[22] Filed: Apr. 30, 1980

[30] Foreign Application Priority Data

May 11, 1979 [NL] Netherlands .......................... 7903737

[51] Int. Cl.³ .............................................. A22C 21/02
[52] U.S. Cl. .................................................. 17/11.1 R
[58] Field of Search .............................. 17/11.1 R, 47

[56] References Cited

U.S. PATENT DOCUMENTS

| | | | |
|---|---|---|---|
| 3,551,942 | 1/1971 | Crane | 17/11.1 R |
| 3,585,675 | 6/1971 | Crane | 17/11.1 R |
| 3,673,637 | 7/1972 | Crane | 17/11.1 R |
| 3,797,068 | 3/1974 | Dillon | 17/11.1 R |

FOREIGN PATENT DOCUMENTS 7500564 1/1975 Netherlands ..................... 17/11.1 R Primary Examiner—Willie G. Abercrombie
Attorney, Agent, or Firm—Newton, Hopkins & Ormsby

[57] ABSTRACT

A picking element for a poultry picking apparatus comprises a beaker-shaped support whose casing surface carrying picking fingers is a truncated conical surface and whose end face is situated substantially transversely to the axis of rotation, there being located between the casing surface and the end face a number of transition surface areas which are situated at a more acute angle to the center line of the casing surface than the end face and which each carry at least one picking finger, the end face carrying a number of picking fingers substantially parallel to the center line.

4 Claims, 3 Drawing Figures

PICKING ELEMENT FOR A POULTRY PICKING APPARATUS

BACKGROUND OF THE INVENTION

1. Field of the Invention

The present invention relates to a picking element for a poultry picking apparatus having a beaker-shaped support which is to be driven rotatably about the center line thereof and whose cylindrical casing surface and end face are provided with picking fingers.

2. Description of the Prior Art

In the prior art picking elements or a poultry picking apparatus have been used.

U.S. Pat. No. 3,585,675, entitled "Poultry Picker", issued on June 22, 1971, to Edward J. Crane, teaches for example a poultry picking machine for picking feathers from poultry, comprising a picking element having a cylindrical casing and a hemispherical end face; only this end face carries exclusively picking fingers disposed at an angle to the axis of rotation. The difficulty with this apparatus is that it is hard to properly secure the picking fingers, which during operation are subjected to strong forces, into the spherical curved end face, while practice has shown that the picking effect accomplished by this type of picking element is not optimum. Another example of the prior art is U.S. Pat. No. 3,797,068, entitled: "Fowl Agitating and Wetting System", issued on Mar. 19, 1974, to Janus J. Dillon, which teaches a picking element which has a truncated casing surface provided with picking fingers mounted thereon and which is used in a picking apparatus wherein the axes of rotation of sets of two picking elements are aligned, the end faces of said picking elements, which do not carry picking fingers, being opposite each other. These sets of picking elements are disposed on either side of the path of travel of the fowl and define a lozenge-shaped passage channel therefor.

SUMMARY OF THE INVENTION

In view of the foregoing it is a primary object of the present invention to remove the aforesaid drawbacks and to provide to this effect a picking element for a poultry picking apparatus whose casing surface is a truncated conical surface and whose end face is substantially transverse to the axis of rotation, there being located between the casing surface and the end face a number of transition surface areas which lie at an angle to the center line more acute than that of the casing surface to said line and which carry at least one picking finger, the end face carrying a number of picking fingers substantially parallel to the center line.

During the picking operation, i.e. during the rotation of the element, the picking fingers substantially axially extending from the end face will swing slightly outwardly and, in conjunction with the picking fingers implanted in the transition surface areas and the casing surface, carry out in an optimum fashion the picking of the poultry to be treated. The picking fingers in the end face which are exposed to the strongest forces are firmly secured in plane surface portions, in which case the angle between the transition surface areas and the center line, which determines the position of the picking fingers disposed therein, may be chosen in such a manner that the picking operation is performed in an optimum fashion.

In a preferred embodiment of the present invention the picking fingers disposed parallel to the center line are located in surface portions of the end face which are situated between the transition surface areas. In another preferred embodiment of the present invention a poultry picking apparatus comprises at least two opposite rows of picking elements having picking fingers radially and axially extending therefrom, the radially extending picking fingers of juxtaposed picking elements meshing with one another.

Thus, the circles described by the ends of the picking fingers, implanted in the casing surface, of two picking elements that are disposed one above the other and next to each other respectively, are overlapping one another as a result of which said picking fingers are particularly effective for pulling out the large wing pins.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF A PREFERRED EMBODIMENT

Figure 1:
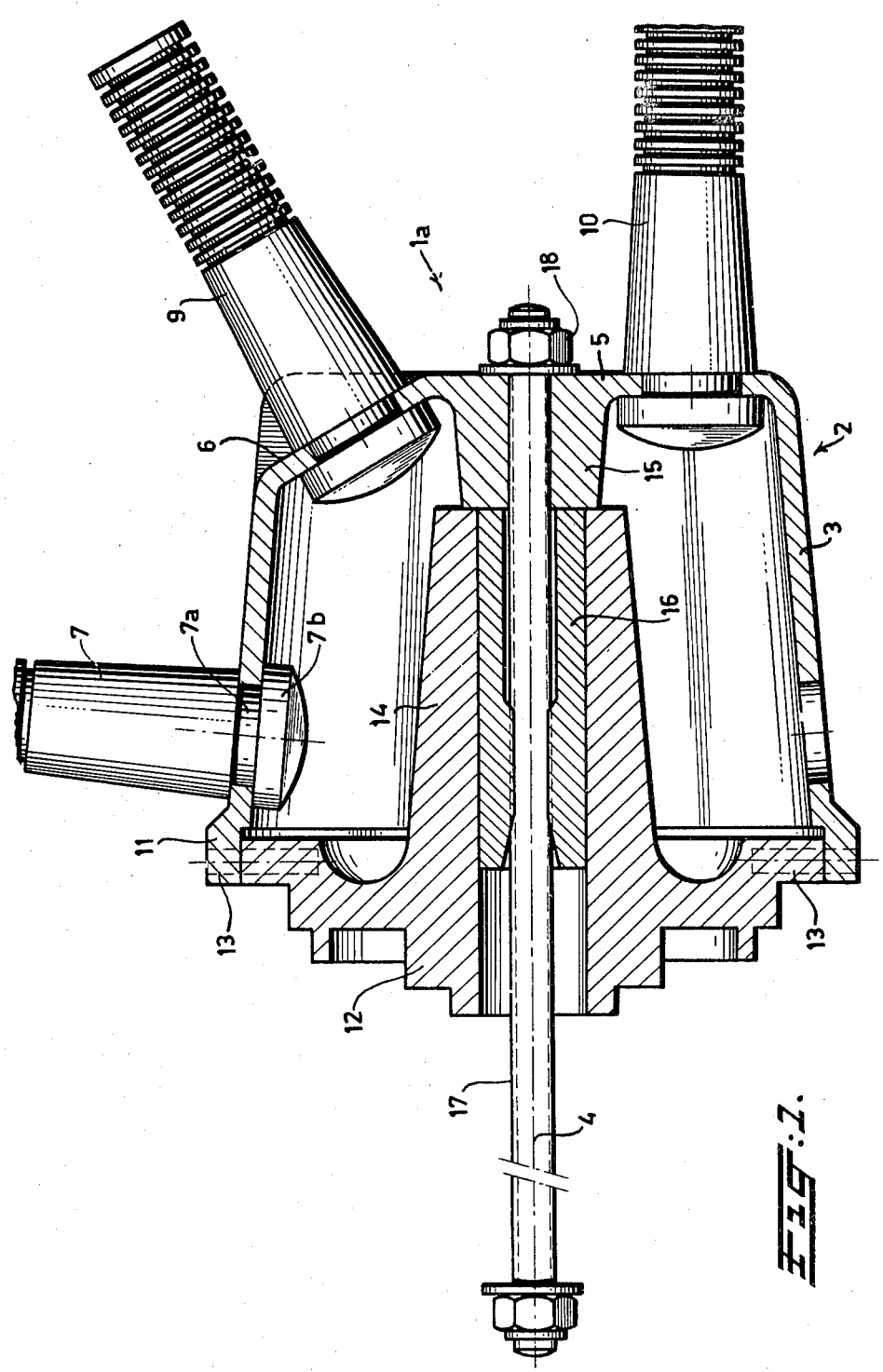
FIG. 1 is a longitudinal cross-sectional view of a picking element according to the present invention.
Figure 2:
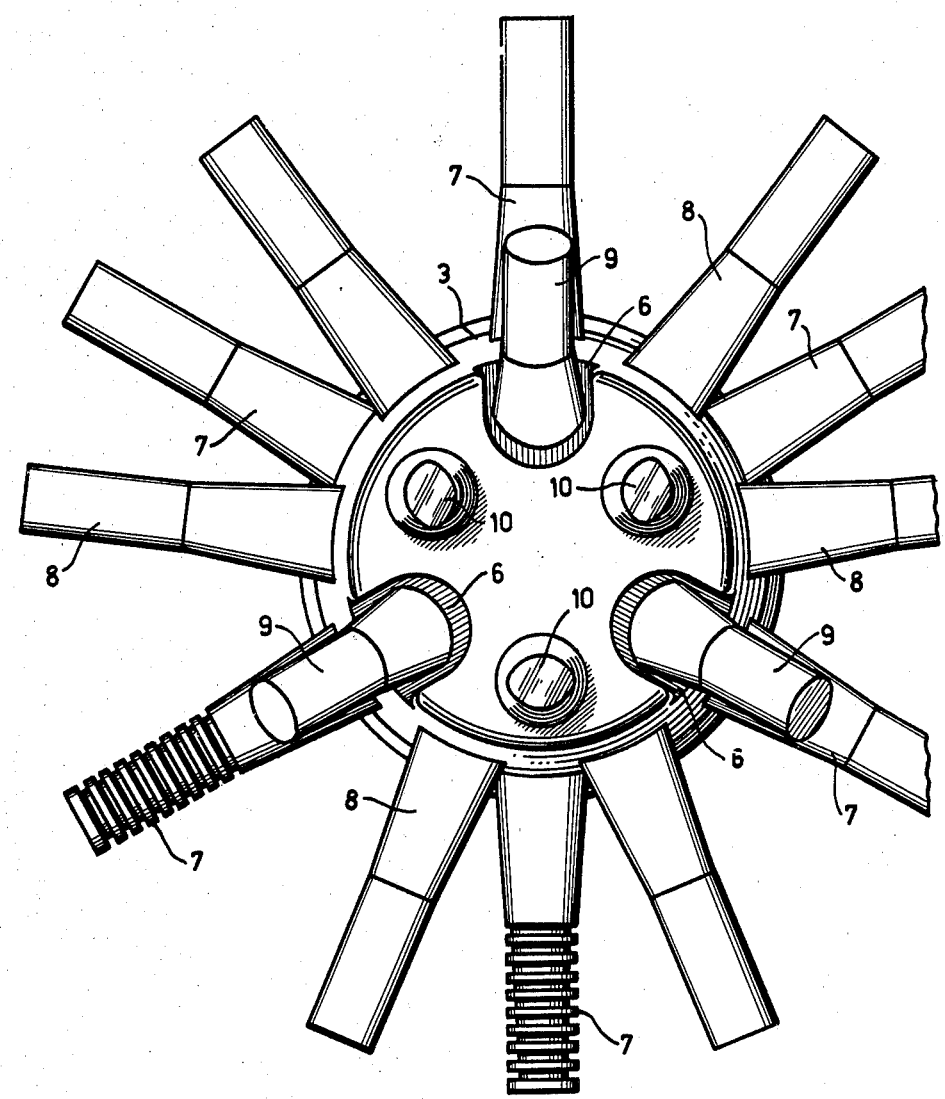
FIG. 2 is a front view of this picking element.

Initially referring to FIG. 1, the picking element, referenced in its entirety by the numeral 1a ... 1c, comprises a beaker-shaped support 2 having a truncated conical casing surface 3, an end face 5 positioned transversely to the center line 4, and three transition surface areas 6 located between the casing surface 3 and the end face 5. The angle between each of these transition surface areas 6 and the center line 4 is more acute than the angle between the casing surface area 3 and said center line.

The casing surface 3 is provided with two rings of picking fingers, i.e. the ring of picking fingers 7 and the ring of picking fingers 8; these picking fingers having a form known per se, comprise a recessed portion 7a and a head 7b for fitting into the openings in the support 2. Each of the transition surface areas 6 is thus provided with a picking finger 9, picking fingers 10 being provided in the end face 5 in the spaces provided between the transition surface areas 6. The latter picking fingers 10 are practically parallel to the center line 4. The surface areas around the openings being plane, it is possible to solidly secure the picking fingers.

Fastening the support to the associated drive shaft may be effected in any suitable manner. The drawing shows an embodiment in which the support has a widened end rim 11 wherein fits the boss 12 secured therein by means of the pins 13 schematically shown; this boss has an inwardly directed portion 14 which when mounted, abuts the stump piece 15 extending from the end face 5 into the interior. Within the portion 14 there is secured the central bush 16 containing the threaded support shaft 17 screwed therein; the whole is retained by means of the nut 18. The other extremity of the threaded shaft 17 is affixed to a suitable driving element (not shown).

Figure 3:
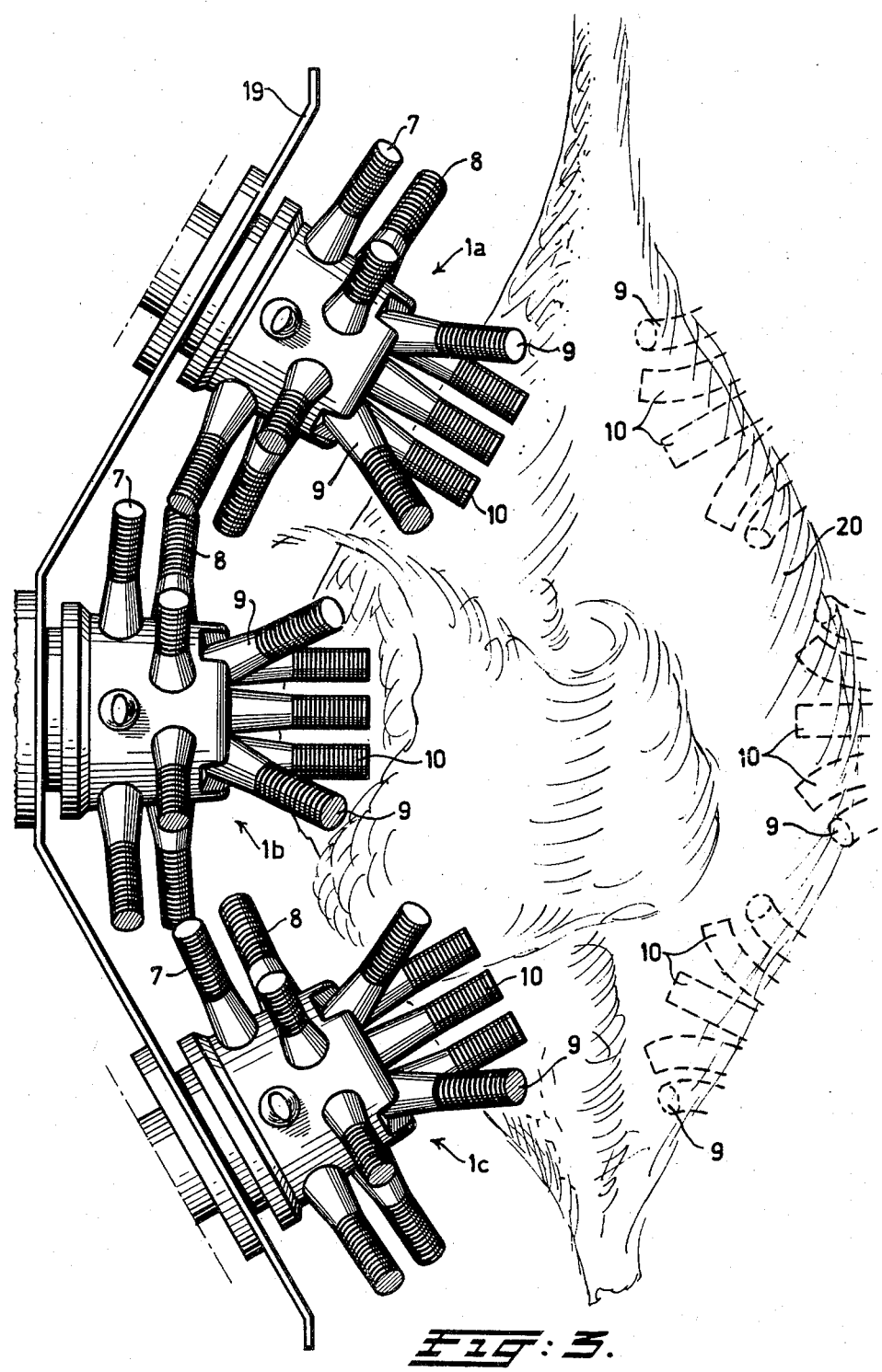
FIG. 3 is a half cross section, half view of a portion of a picking apparatus wherein picking elements according to the present invention are used.

Referring now to FIG. 3, which is a cross-sectional view of half a picking apparatus provided with picking elements according to the present invention, three picking elements 1a, 1b, 1c are disposed on the frame 19 schematically shown. Therein, the interspacing of the adjoining picking elements is so chosen that the radially extending picking fingers 7, 8 of the picking elements mesh with one another, as shown in the drawing, thus preventing parts of the bird 20, schematically illustrated, from getting into the area behind the picking fingers situated closest to the frame 19.

As schematically shown in the right-hand portion of FIG. 3, during operation the ends of the inclined picking fingers 9 and those of the axial picking fingers 10 will swing outwardly under the influence of the centrifugal force, so that it is not the top ends of the picking fingers but the end surface areas which wipe the poultry.

Practice has shown that by using picking elements as described herebefore a picking operation is obtained which is considerably better than the one obtained by means of known picking elements provided with a disk which is disposed transversely to the drive shaft and which extends axially therefrom, or by means of picking elements as known from U.S. Pat. No. 3,585,675 (CRANE).

What is claimed is:

1. A picking element for a poultry picking apparatus, comprising a beaker-shaped support which is to be driven rotatably about the center line thereof and whose cylindrical casing surface and end face are provided with picking fingers and wherein the casing surface is a truncated conical surface of which the end face is disposed substantially transversely to the axis of rotation, while between the casing surface and the end face are located a number of transition surface areas which lie at a more acute angle to the center line of the casing surface than the end face and which each carry at least one picking finger, the end face carrying a number of picking fingers substantially parallel to the center line.

2. A picking element for a poultry picking apparatus, according to claim 1, wherein the picking fingers being parallel to the center line are mounted in surface portions of the end face which are situated between the transition surface areas.

3. A picking element for a poultry picking apparatus according to claim 1, wherein the casing surface carries two rings of radially extending picking fingers.

4. A poultry picking apparatus comprising at least two opposite rows of picking elements having picking fingers radially and axially extending therefrom, wherein the radially extending picking fingers of juxtaposed picking elements mesh with one another.

* * * * *